(12) United States Patent
Nishii et al.

(10) Patent No.: US 6,407,389 B1
(45) Date of Patent: Jun. 18, 2002

(54) INFRARED RAYS DETECTION APPARATUS

(75) Inventors: Katsuyoshi Nishii, Okazaki; Shinji Nanba, Kariya; Teiyuu Kimura, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/526,868

(22) Filed: Mar. 16, 2000

(30) Foreign Application Priority Data

Mar. 26, 1999 (JP) ............................................ 11-084284
Feb. 2, 2000 (JP) ...................................... 2000-025262

(51) Int. Cl.⁷ .................................................. G01J 5/02
(52) U.S. Cl. ................................ 250/339.4; 250/339.2; 250/339.3
(58) Field of Search ........................... 250/339.4, 339.3, 250/339.2, 339.1, 338.1, 336.1, 353

(56) References Cited

U.S. PATENT DOCUMENTS 4,238,675 A * 12/1980 Turlej et al. ................. 250/353

FOREIGN PATENT DOCUMENTS

| JP | 61-39001 | 2/1986 |
| JP | 8-62048 | 3/1996 |
| JP | 9-21701 | 1/1997 |
| JP | 10-38696 | 2/1998 |
| JP | 10-132954 | 5/1998 |

\* cited by examiner

*Primary Examiner*—Hung Xuan Dang
(74) *Attorney, Agent, or Firm*—Law Offices of David G. Posz

(57) ABSTRACT

An infrared rays detection apparatus including an optical window member having a characteristic that scatters noise light, which is capable of reducing an influence of noise light with a simple structure. An infrared rays detection apparatus includes: a condenser lens; an infrared rays image sensor made up of plural thermal detection elements; and a signal detection/process circuit (SDP circuit). The image sensor detects a thermal distribution of a predetermined area condensed by the condenser lens in a passenger room. The SDP circuit makes a thermal image data based on the thermal distribution detected by the image sensor. Various types of system control circuits control each of the vehicular system as described later based on the thermal image data provided from the SDP circuit. The condenser lens is formed so that noise light such as visible light is scattered thereby and that infrared rays is transmitted therethrough to the image sensor. Furthermore, when all temperatures detected by all of the thermal detection elements uniformly rise, the SDP circuit determines that scattered visible light is entered and than makes obtained data invalid.

16 Claims, 15 Drawing Sheets

(POSITION OF ELEMENT 16)

(POSITION OF ELEMENT 16)

| SURFACE ROUGHNESS Ra [μm] | TRANS-MISSIVITY [%] |
|---|---|
| 0.087 | 72 |
| 0.45 | 61 |
| 0.94 | 50 |
| 1.319 | 43 |
| 1.667 | 36 |

INFRARED RAYS DETECTION APPARATUS

CROSS REFERENCE TO RELATED APPLICATION

This application is based upon Japanese Patent Application Nos. Hei. 11-84284 filed on Mar. 26, 1999, and 2000-25262 filed on Feb. 2, 2000, the contents of which are incorporated herein by reference.

BACKGROUND OF THE INVENTION

1. Field of the Invention

This invention relates to infrared rays detection apparatuses, and particular to an infrared rays detection apparatus, which has an optical window (e.g., a condenser lens) having a characteristic that scatters noise right such as visible right.

2. Related Art

Recently, an infrared rays detection apparatus is used for a vehicular control, such as an air-conditioner control or an air bag control, by detecting a position of passenger in a vehicle. Furthermore, this kind of infrared rays detection apparatus is also used for a security control by detecting an invasion into the vehicle during vehicle's parking. That is, various vehicle controls are performed by image-forming infrared rays radiated from a person body on a thermal detection element by using a condenser lens, and by detecting an existence of a person based on a detection output from the thermal detection element, and by performing the various controls based on the detection result.

Here, a wavelength of the infrared rays radiated from a person body is approximately within a wavelength range of 8–12 $\mu$m. Since infrared rays have such the wavelength range, the infrared rays may be declined when a normal condenser lens is used. Therefore, it is preferable to employ a condenser lens made of a particular material such as a high-density polyethylene, a chalcogens glass, $BaF_2$, or ZnS.

However, since such the particular material indicates great light permeability against light having a wide frequency, noise light such as solar light may enter the thermal detection element through the condenser lens, so that the security control may falsely judge the existence of person.

On the contrary, in JP-A-61-39001 and JP-A-9-21701 disclose the following technology. That is, particulates having different refractive indexes or bubbles are mixed into an optical window member for infrared rays, so that particular infrared rays within a specific wavelength band, which is a target wavelength band to be detected by the thermal detection element, can be transmitted, and that visible right or near infrared rays can be scattered. As a result, an S/N ratio (signal/noise ratio) of a thermal detection element can be improved However, even in an infrared rays sensor including the optical window member having this characteristic, when noise light such as reflected solar light is entered, the noise light may influence a detection output of the infrared rays sensor. That is, when the optical window member is positioned close to the thermal detection element, noise light scattered by the optical window member may enter the thermal detection element. In this case, the detection output of the thermal detection element may indicate twice as much as a normal detection output due to the noise light entered to the thermal detection element. In this case, the security control may falsely detect a target object to be measured, when the security control cannot judge whether an output change of the thermal detection element is due to the noise light or a change of the target object to be measured itself.

Here, it can be thought that an additional sensor such as an illuminometer to measure an amount of entered light is added to the infrared rays sensor, so as to judge an entering of the noise light. However, this countermeasure may become bulky. Furthermore, it can be thought that a filter for filtering off the visible light is applied. However, this countermeasure is also not preferable because the filter may also decrease a transparency of the wavelength band to be originally needed.

SUMMARY OF THE INVENTION

This invention has been conceived in view of the background thus far described and its first object is to reduce an influence of noise light with a simple structure.

Its second object is to provide an infrared rays detection apparatus, which has an optical window having a characteristic that scatters noise light, being capable of reducing an influence of noise light with a simple structure.

According to the present invention, infrared rays radiated from a target object to be measured is condensed by an optical window, and is image-formed on a plurality of thermal detection elements. A thermal data generator generates a thermal image of the target object to be measured based on the detection outputs from the thermal detection elements. Here, when noise light is entered to the optical window, the noise light is scattered by the optical window; however, the scattered noise light may be entered to the thermal detection elements. In this case, the detection outputs from almost all the thermal detection elements uniformly change, because such scattered noise light is uniformly entered to the almost all the thermal detection elements. Therefore, when the detection outputs uniformly change each other, a judging portion determines that the noise light is entered to the thermal detection elements. Hence, it can prevent from decreasing of reliability of making the thermal image data by the thermal image data generator. That is, it can reduce an influence of noise light with a simple structure.

According to another aspect of the present invention, infrared rays radiated from a target object to be measured is condensed by an optical window, and is image-formed on a plurality of thermal detection elements. A thermal data generator generates a thermal image of the target object to be measured based on the first detection output from the thermal detection element. Here, when noise light is entered to the optical window, the noise light is scattered by the optical window; however, the scattered noise light may be entered to a reference element aw well as the thermal detection element. Therefore, an output portion calculates a difference between the first detection output and the second detection output, and outputs the difference as an output indicating the infrared rays. Hence, it can prevent from decreasing of reliability of making the thermal image data by the thermal image data generator. That is, it can reduce an influence of noise light with a simple structure.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS (First Embodiment)

A first embodiment, in which the present invention is applied to a vehicular infrared rays detection apparatus, will be explained hereinafter with reference to FIGS. 1 through 13.

Figure 2:
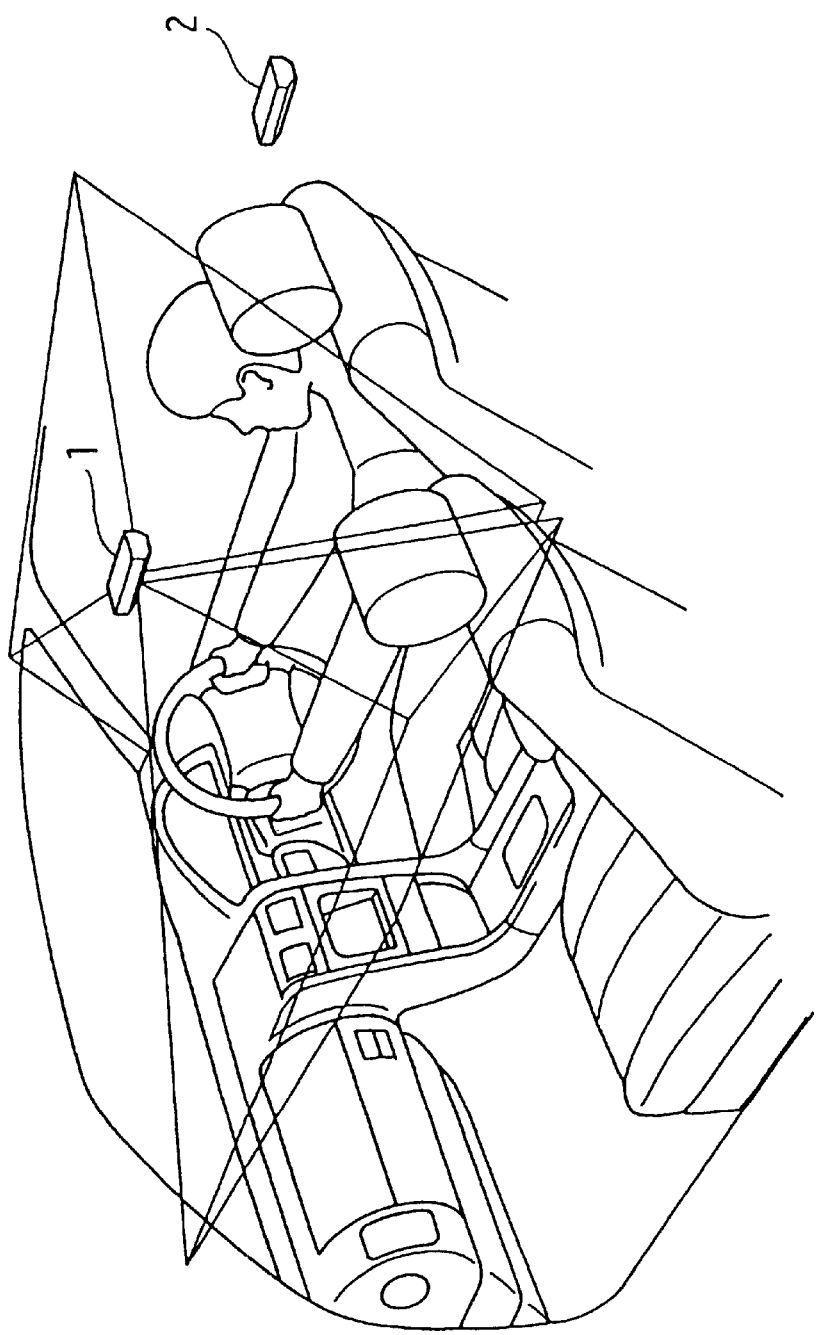
FIG. 2 is a perspective view illustrating a position and a target detection area of the infrared rays detection apparatus.

As shown in FIG. 2, an infrared rays detection apparatus is arranged on a ceiling of a passenger room. In this figure, the infrared rays detection apparatuses 1 and 2 are respectively provided at positions corresponding to a front seat and a rear seat. In this case, a target detection area of the front seat infrared rays detection apparatus 1 is set to a driver seat and a passenger seat. Furthermore, a target detection area of the rear seat infrared rays detection apparatus 2 is set to a right side rear seat and a left side rear seat.

Figure 3:
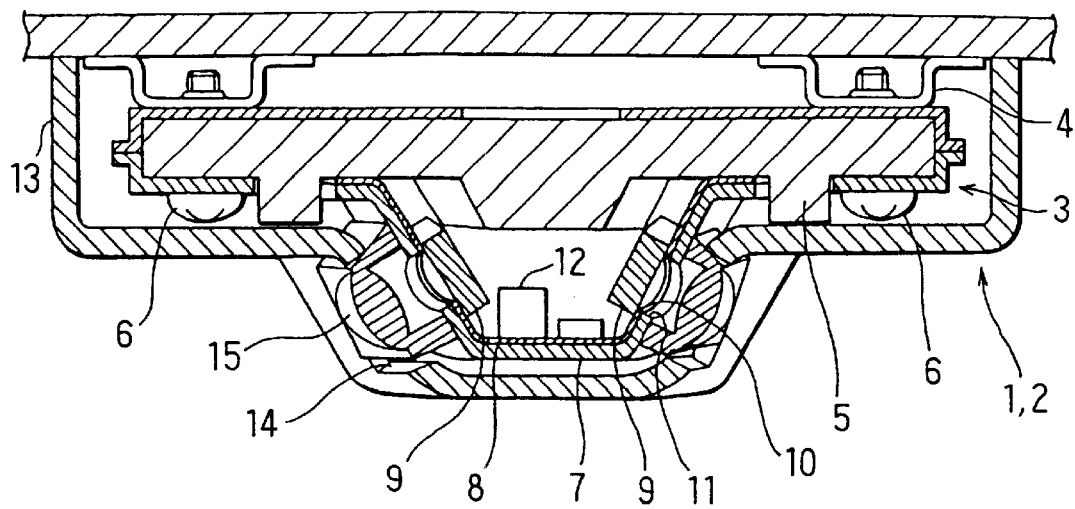
FIG. 3 is a sectional view of the infrared rays detection apparatus.

FIG. 3 shows a sectional view of the infrared rays detection apparatuses 1 and 2. In this figure, a base holder 3 is fixed to a roof of the vehicle by a fixing stay 4. The base bolder 3 includes a thermal insulating material 5, and is fixed to the ceiling by angle adjusting screws 6. A fixed angle to the ceiling is adjustable by angle adjusting screws 6.

A thermal transfer substrate 7, which is formed by being protruded in an expanded condition, is attached to the thermal insulating material 5, and a flexible printed substrate 8 is attached to a back surface of the thermal transfer substrate 7. An infrared rays image sensor 9 is fixed to the flexible printed substrate 8, and the infrared rays image sensor 9 is exposed to outside through window portions 10 and 11, which are provided to the flexible printed substrate 8 and the thermal transfer substrate 7. Furthermore, an electronic part 12 is mounted on the flexible printed substrate 8.

A cover 13 is covered on an entire portion of the above-described structure. A condenser lens (optical window, optical window member) 15 is provided to the cover 13, so that thermal image of the target detection area is image-formed onto the infrared rays image sensor 9 through the condenser lens 15. The condenser lens 15 is a particular condenser lens for infrared rays, is made of a particular material such as a high-density polyethylene, a chalcogens glass, $BaF_2$, or ZnS, and has a spherical surface, non-spherical surface, or a Fresnel shape.

Figure 1:
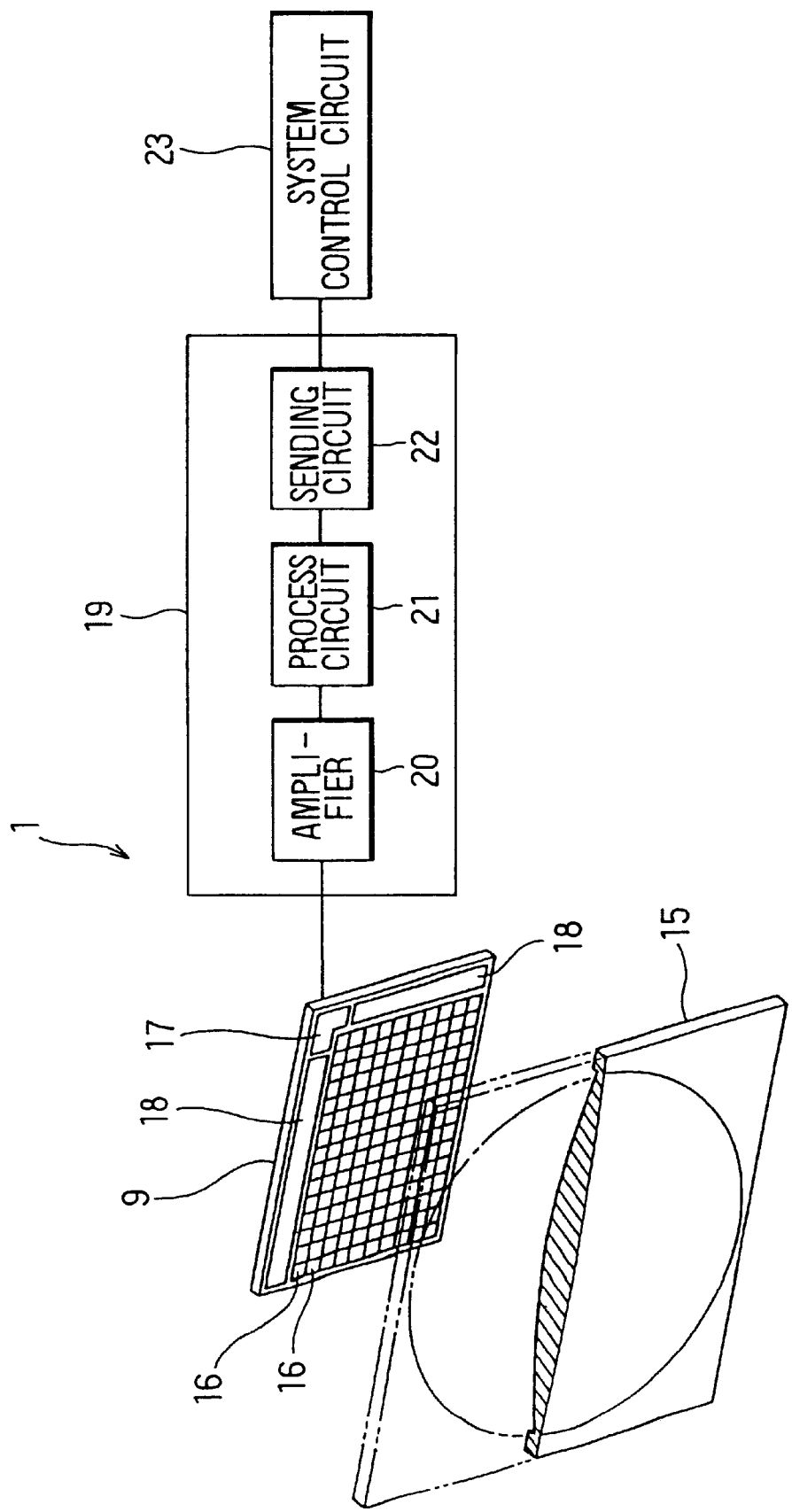
FIG. 1 is a schematic diagram illustrating an entire structure of an infrared rays detection apparatus of a first embodiment according to the present invention.

FIG. 1 schematically shows an entire structure of the infrared rays detection apparatus 1. In FIG. 1, the infrared rays image sensor 9 is made up of plural thermal detection elements 16 assembled in two dimensions matrix such as 15×10 units, and image-forms the infrared rays radiated from around the seats onto the thermal detection elements 16 as the thermal image by condensing using the condenser lens 15. In this case, the condenser lens 15 is designed so that 750×500 mm area being 500 mm away can be condensed on the entire thermal detection elements 16. Therefore, since the number of the thermal detection elements 16 in the infrared rays image sensor 9 is 15×10 units, one thermal detection element 16 can detect 50 mm square (50×50 mm) (detection resolution).

In the infrared rays detection sensor 9, at surrounding portion of the thermal detection elements 16, a signal generating circuit 17 and a selecting circuit 18 are provided.

Figure 4A:
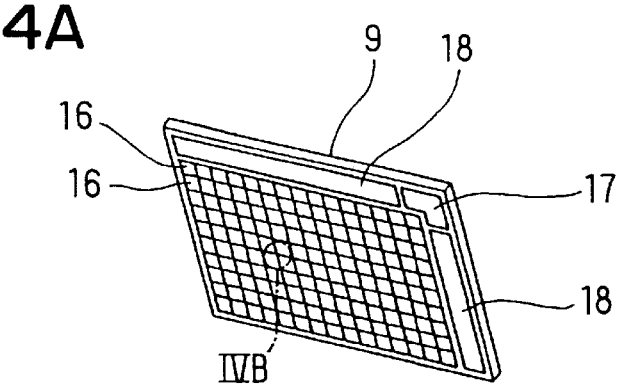
FIG. 4A is a perspective view of an infrared rays image sensor.
Figure 4B:
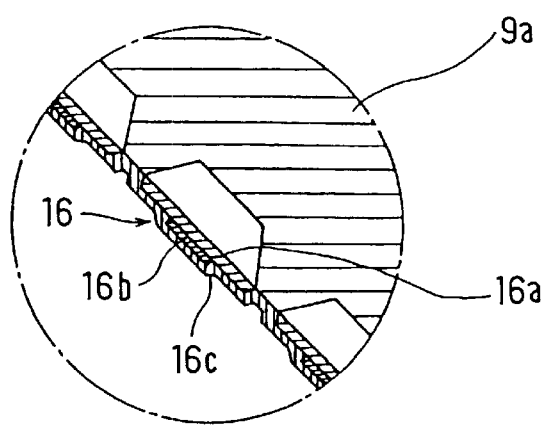
FIG. 4B is an enlarged sectional view at a circle IVB in FIG. 4A.

As shown in FIGS. 4A and 4B, the thermal detection element 16 is manufactured by forming a SiO$_2$ thin film 16a, a metallic thin film resistor portion 16b, and an absorbing film 16c; and by removing a back surface side of the metallic thin film resistor portion 16b by etching. As a result, the thermal detection element 16 has a thermal insulating structure in which air gap is provided between the metallic thin film resistor portion 16b and a silicon substrate 9a.

Figure 5:
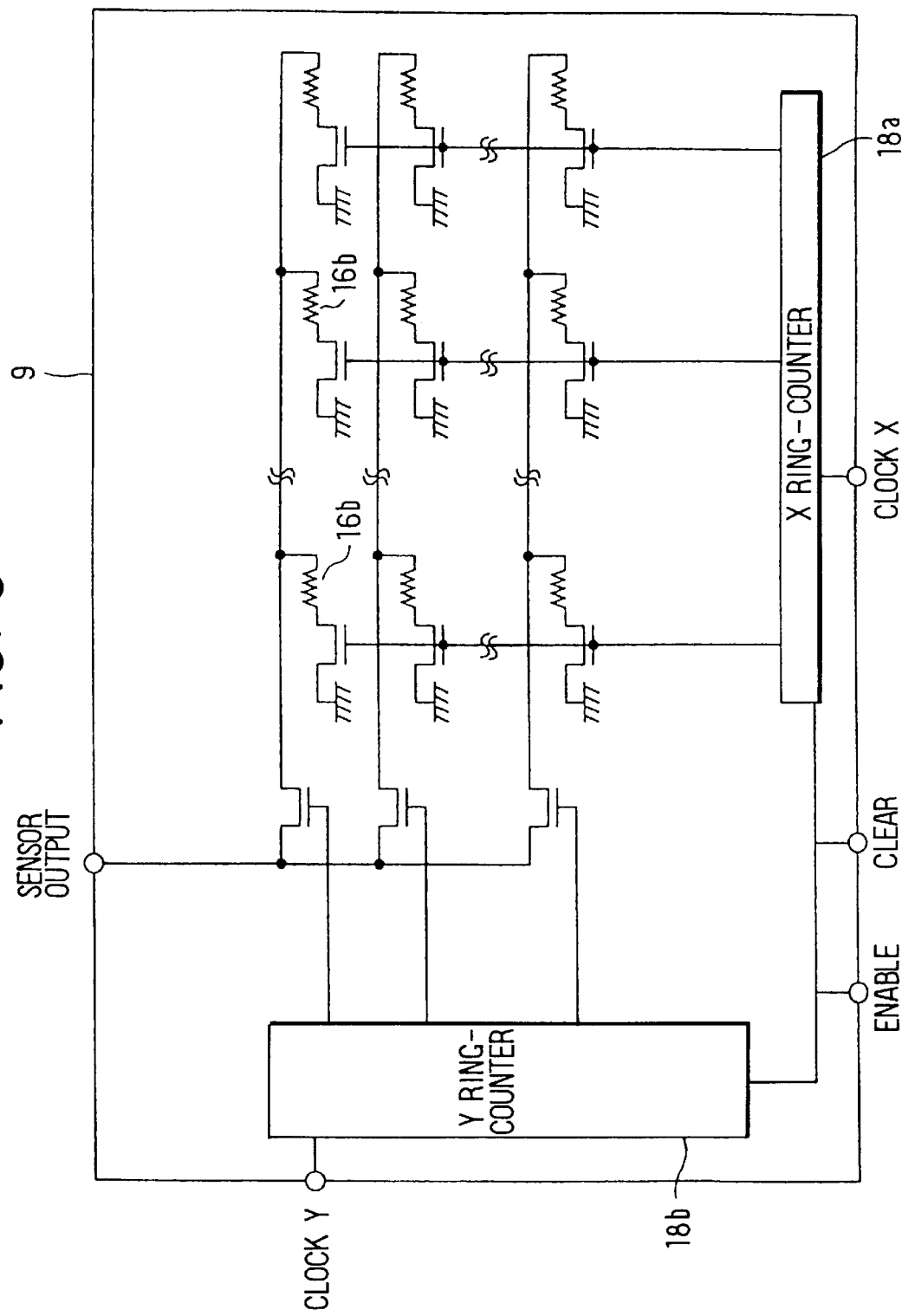
FIG. 5 is a schematic diagram illustrating an electrical structure of the infrared rays image sensor.

FIG. 5 schematically shows an electrical structure of the infrared rays image sensor 9. In this figure, each of the thermal detection elements 16 is selectively selected by using an X-ring counter 18a and a Y-ring counter 18b through an FET (Field Effect Transistor) The infrared rays image sensor 9 can detect temperature distribution of the target detection area, which is decided to each thermal detection element 16, by sequentially inputting output signals from the selected thermal detection element 16 into a signal detection/process circuit 19 shown in FIG. 1.

In other words, the signal detection/process circuit (thermal data making means and judgment means) 19 is provided with a signal amplifier 20, a signal process circuit 21, and a data sending circuit 22. The signal process circuit 21 makes the thermal image data based on a temperature distribution detected by the infrared rays image sensor 9.

Various types of system control circuits 23 control each of the vehicular system as described later based on the thermal image data provided from the signal detection/process circuit 19.

Here, it is extremely difficult to judge whether outputs from the infrared rays image sensor 9 are correct or not. That is, when noise light such as reflected solar light is entered, the noise light may also influence the outputs from the infrared rays image sensor 9. In this case, it needs to judge whether the changes of the outputs from the infrared rays image sensor 9 are due to the noise light or due to temperature changes of the target object to be measured, so as not to falsely detect the target object to be measured.

Therefore, in this embodiment, the condenser lens 15 is designed so that the condenser lens 15 transmits infrared rays (8–12 μm) radiated from person, and scatters the noise light such as the visible light.

That is, the condenser lens 15 is manufactured by mixing bubbles as particulates into ZnS. The bubbles are automatically intermixed into the ZnS, when the ZnS is manufactured by a pressurized sinter technique, and can scatter the visible light having short wavelength.

Here, reasons why only visible light can be scattered by bubbles will be explained hereinafter. That is, in general, when plural kinds of particulates having different refractive index are dispersed in a material, it is known that the particulates scatter entered light in the following scattering conditions depending on a dispersing particle diameter and a wavelength of the entered light.

(1) Rayleigh scattering, which occurs when the particle diameter is greatly small compared to the wavelength of the entered light;

(2) Mie scattering, which occurs when the particle diameter is not negligibly small compared to the wavelength of the entered light; and (3) Scattering, which occurs when the particle diameter is remarkably big compared to the wavelength of the entered light.

In these scatterings, degree of scattering of the entered light of the Mie scattering is larger than that of the Rayleigh scattering. In the above-described condition in which particulates are dispersed, particle diameter D (μm) of the particulate in which the Mie scattering becomes maximum can be calculated by using the following equation.

$$D = 4.1 \times \lambda / (2\pi(m-1))$$

Here, λ is a wavelength of the entered light; π is the PI; m is a ratio of refractive indexes of the particulate and this material.

Therefore, according to the condenser lens 15 of this embodiment, the particle diameter D (μm) of the particulate is designed, so that the Mie scattering occurs against the visible light having short wavelength by mixing the bubble, whereas the Rayleigh scattering, whose degree of the scattering is smaller than that of the Mie scattering, occurs against light whose wavelength is around 10 μm by mixing the bubble. As a result, the condenser lens 15 can transmit the infrared rays within a specific wavelength band with scattering the visible light.

Figure 6:
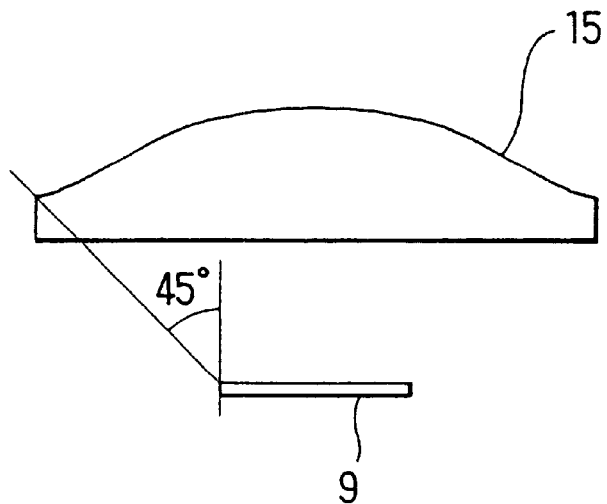
FIG. 6 is a diagram illustrating a relationship between positions of a condenser lens and the infrared rays image sensor.

In this case, it is preferable to set the degree of the scattering is preferable of the visible light of the condenser lens large. As a result, a judgment for entering disturbance light can become much easy, because influence due to an entering direction of the disturbance light or influence due to an entering area decreases. It is preferable to arrange each position of the condenser lens 15 and the infrared rays image sensor 9, so as to have a predetermined relation as shown in FIG. 6.

Figure 7:
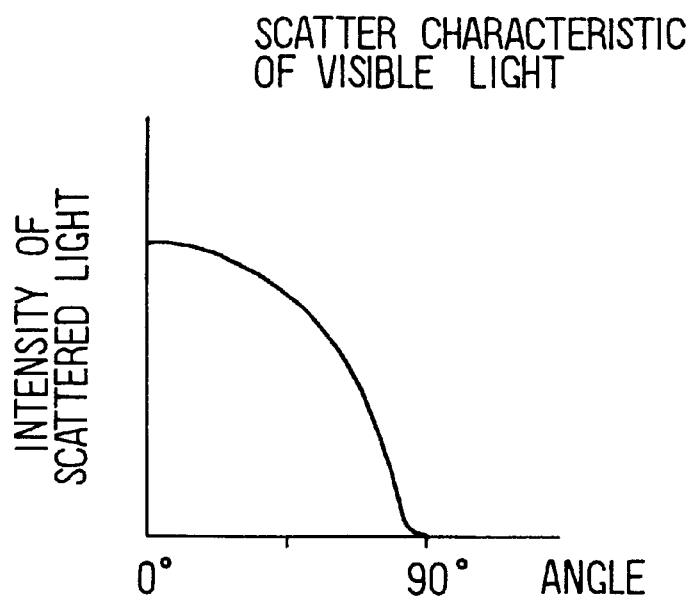
FIG. 7 is a graph illustrating a scatter characteristic of the condenser lens for visible light.

In detail, when the noise light is assumed to perpendicularly outgo from the condenser lens 15 as shown in FIG. 7, the degree of the scattering at the condenser lens 15 has a scattering intensity equal to or more than 50% at a scattering angle of 45° with respect to a scattering intensity at a scattering angle 0° (outgoing direction). Therefore, as shown in FIG. 6, it is preferable to set an effective diameter of the condenser lens 15 to larger than a particular area, which corresponds to 45° with respect to a normal direction of the condenser lens 15 from an edge of thereof towards a outward radial direction. Here, when the effective diameter of the condenser lens 15 is smaller than the particular area, noise light, which has a large intensity corresponding to that is scattered at an entire area corresponding to the effective diameter, enters the thermal detection element 16 positioned at a center portion of the infrared rays image sensor 9. On the contrary, in this case, such the noise light, which has a large intensity corresponding to that is scattered at an entire area corresponding to the effective diameter, does not enter the thermal detection element 16 positioned at a peripheral portion of the infrared rays image sensor 9. As a result, since an amount of changes of the thermal detection element 16 at the center portion becomes large compared to that the thermal detection element 16 at the peripheral portion, differences in received noise light occurs among the thermal detection elements 16, and the entered noise light may be falsely detected.

Next, operations of the above-described structure will be explained.

For example, in the case where the driver is seated on the driver seat, infrared rays radiated from the driver reach the infrared rays image sensor 9 through the condenser lens 15 of the front seat infrared rays detection apparatus 1.

In the thermal detection element 16 of the infrared rays image sensor 9, entered infrared rays are converted into heat by being absorbed by the absorbing film 16c. Temperature of the metallic thin film resistor portion 16b rises due to the converted heat, so that the resistance thereof is changed. Hence, a temperature distribution at the target detection area can be detected by sequentially outputting the detection outputs (sensor output) from the thermal detection element 16 to the signal detection/process circuit 19.

The signal detection/process circuit 19 makes thermal image data of the target detection area by inputting the detection outputs from all of the thermal detection elements 16. In detail, the signal detection/process circuit 19 makes thermal image data by amplifying temperature distribution data detected by the infrared rays image sensor 9 by using the signal amplifier 20, and by processing it by using the signal processing circuit 21. The thermal image data is sent to the various types of system control circuits 23 through the data sending circuit 22, and is used for detecting a position of the person existing in the target detection area.

Figure 8:
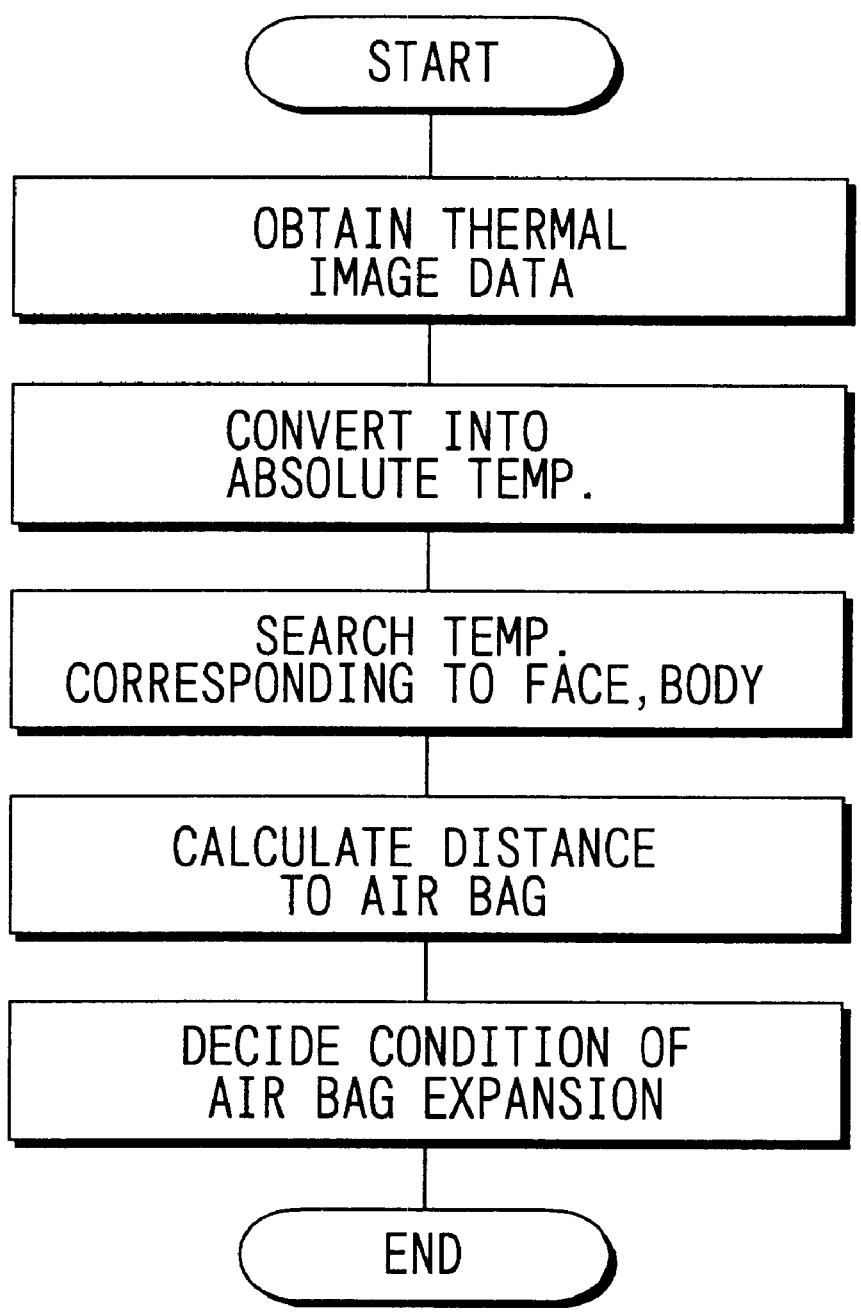
FIG. 8 is a flowchart illustrating an operation of an air bag system.

FIG. 8 shows a flowchart illustrating an operation of an air bag system as one of the various types of system control circuits 23. In this figure, the air bag system firstly obtains the thermal image data from the signal detection/process circuit 19. After that, the air bag system converts the thermal image data into the temperature data, and searches particular temperature corresponding to that of a face or a body.

Next, the air bag system calculates a distance from the face or the body to an air bag, and determines control parameter by determining expansion condition of the airbag. According to this control parameter, when the face or the body is too close to the air bag, the air bag system controls such that: the air bag is not expanded; an expansion speed of the air bag is restricted; or total amount of gas injection is set small.

Hence, it can adequately operate the air bag even in the case where the driver drives near a steering wheel at the timing when the air bag is about to be operated, because air bag system operates the air bag so that: the air bag is not operated; the expansion speed of the air bag is restricted; or total amount of gas injection is set small.

Figure 9:
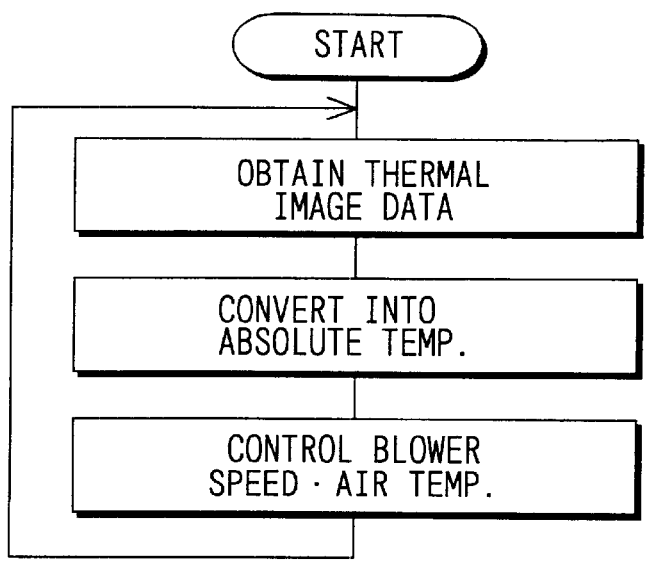
FIG. 9 is a flowchart illustrating an operation of an air-conditioner system.

FIG. 9 shows a flowchart illustrating an operation of an air-conditioner system as one of the various types of system control circuits 23. In this figure, the air-conditioner system firstly obtains the thermal image data from the signal detection/process circuit 19. After that, the air-conditioner system converts the thermal image data into the temperature data, and controls distribution direction and the temperature of an air-conditioner.

In detail, in addition to concentrically sending conditioned air to the potion where the person (driver) is seated, the distribution direction of the conditioned air is adjusted depending on positions of the body or the face. Furthermore, when there is large temperature difference among skin temperature of the person, the air-conditioner system adequately sends the conditioned air so that the temperature difference is cancelled.

Therefore, all passengers in the passenger room can feel comfort, because the conditioned air is sent with adequate temperature and adequate blower speed independent of: the position where the person is seated; a physique; or the skin temperature.

Figure 10:
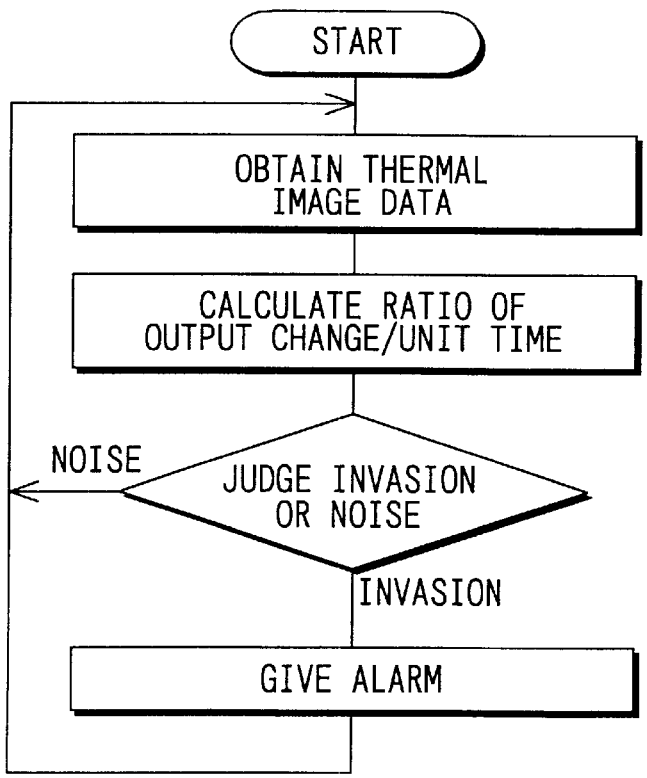
FIG. 10 is a flowchart illustrating an operation of a security system.

FIG. 10 shows a flowchart illustrating an operation of a security system as one of the various types of system control circuits 23. In this figure, the security system firstly obtains the thermal image data from the signal detection/process circuit 19. After that, the security system calculates output changes per unit time (ratio of output change and unit time), and then judges whether the changes are due to the invasion or noise, and gives an alarm when it is judged as the invasion.

In detail, in the case where no passenger (including the driver) is in the passenger, and when temperature of the target detection area of the infrared rays image sensor 9 increases due to shining to the passenger room, the security system can detect this temperature rising as the shining because the temperature of the entire target detection area uniformly gradually rises. On the contrary, when the temperature of the target detection area partly rises suddenly and further the high temperature area moves, the security system can detect as the invasion, and gives an alarm.

Here, when the visible light such as the solar light enters the condenser lens 15, an infrared rays image of the target object to be measured is image-formed on the thermal detection element 16, because the visible light is scattered by the small bubbles contained in the condenser lens 15, whereas the infrared rays are transmitted. Hence, the signal detection/process circuit 19 can make and output the thermal image data of the target object to be measured with preventing an influence of the visible light. However, since a distance between the condenser lens 15 and the infrared rays image sensor 9 is short, when the visible light scattered at the condenser lens 15 enters to the infrared rays image senor 9, the signal detection/process circuit 19 may not accurately make the thermal image data.

Therefore, in this embodiment, the signal detection/process circuit 19 judges the entering the noise light as follows.

Figure 11:
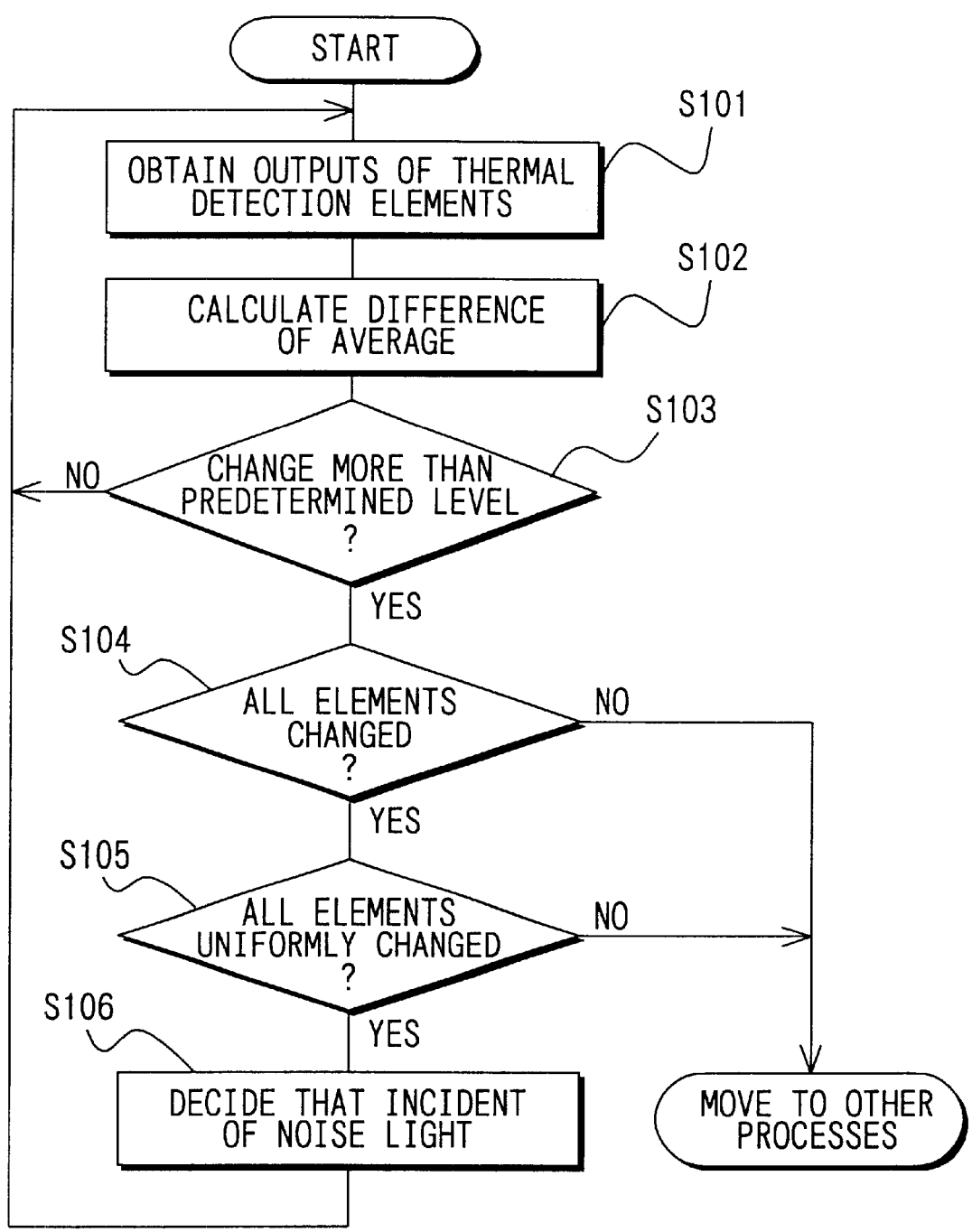
FIG. 11 is a flowchart illustrating a noise light entering judgment performed by a signal detection/process circuit.

FIG. 11 shows a flowchart illustrating a noise light entering judgment performed by the signal detection/process circuit 19. This flowchart only shows a particular operation when the signal detection/process circuit 19 performs the noise light detection. In this figure, at step S101, the signal detection/process circuit 19 obtains the detection outputs from the thermal detection element 16. After that, at step S102, the signal detection/process circuit 19 calculates difference between average of the obtained data in this time and that of the obtained data in last time. When the difference changes equal to or more than a predetermined level (step S103: YES), the signal detection/process circuit 19 judges whether the noise has entered or not.

Figure 12A:
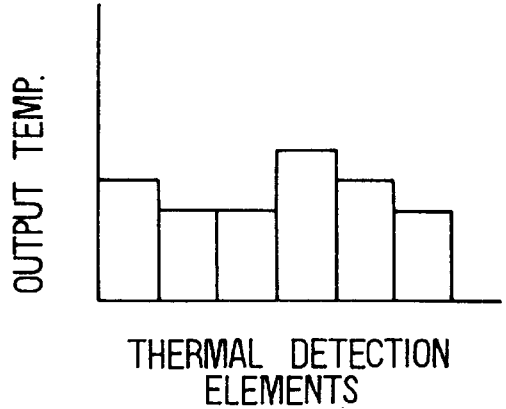
FIGS. 12A and 12B are diagrams illustrating detection output from each thermal detection element, when visible light is entered.
Figure 12B:
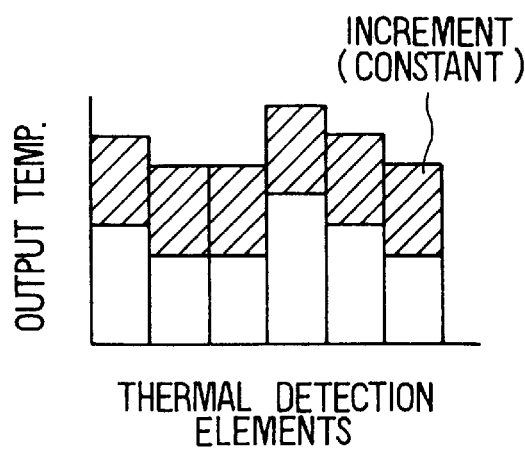

In detail, in the case where the visible light scattered at the condenser lens 15 enters the thermal detection element 16, since the visible light is uniformly scattered at the condenser lens 15, all thermal detection elements 16 can be assumed that they uniformly receive the scattered visible light. Therefore, as shown in FIG. 12, output changes corresponding $\Delta T°$ C. simultaneously occur at all of the thermal detection elements 16. It is thought that a main factor for the fact that all of the detection outputs from the thermal detection elements 16 simultaneously change by the same amount is due to the entering of the visible light or a masking a front surface of the infrared rays image sensor 9.

Figure 13A:
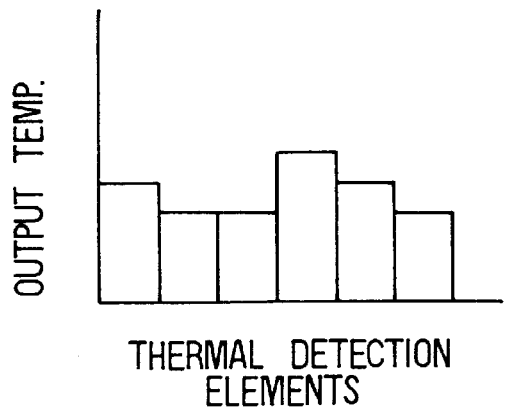
FIGS. 13A and 13B are diagrams illustrating detection output from each thermal detection element, when a front surface is covered.
Figure 13B:
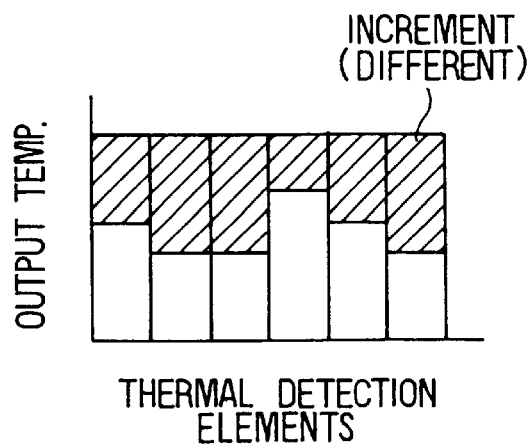

However, when the front surface of the infrared rays image sensor 9 is masked by a cover, since a temperature of the cover is generally uniform, as shown in FIG. 13, the detection outputs from all of the thermal detection elements 16 becomes uniform. Therefore, the temperature of the cover needs to be uniform and further the temperature of area obtained just before the masking also needs to be uniform, if the detection outputs of all of the thermal detection elements 16 simultaneously change by the same amount. However, there is little possibility these conditions occur. Furthermore, even if the temperature of the cover is uniform and further the temperature of area obtained just before the masking also is uniform, there is little possibility that detection output of all of the thermal detection elements 16 change by the same amount because of a distortion of the condenser lens 15 or the like.

Therefore, when the detection outputs of all of the thermal lo detection elements 16 change (step S104: YES), and when the amounts of changes of all of the thermal detection elements 16 are substantially the same each other (step S105: YES), the signal detection/process circuit 19 determines that the noise has entered to the thermal detection elements 16 (step S106) and does not make the thermal image data. As a result, the thermal image data can be accurately made without causing the influence from the noise light.

According to this embodiment, in the case where the condenser lens 15 of the infrared rays image sensor 9, which has the characteristic so that the infrared rays of the particular band can be transmitted and that the noise light is scattered, is used, and when the detection outputs of all of the thermal detection elements 16 uniformly rises, the signal detection/process circuit 19 determines that the noise light has entered and makes the obtained data invalid. Therefore, the thermal image data can be accurately made without causing the influence of the noise light, and each of the various systems can be accurately operated.

Furthermore, the condenser lens 15 is manufactured by naturally intermixing the bubbles into the ZnS as the material of the condenser lens 15 during manufacturing the ZnS by the pressurized sinter technique. Therefore, this kind of condenser lens 15 can be manufactured at low cost.

(Second embodiment)

Next, a second embodiment of the present invention will be explained with reference to FIGS. 14 to 19. In this embodiment, the degree of the scattering is increased by controlling surface roughness of the condenser lens 15 in addition to intermixing the bubbles or the like for scattering the visible light into the condenser lens 15.

Figure 14A:
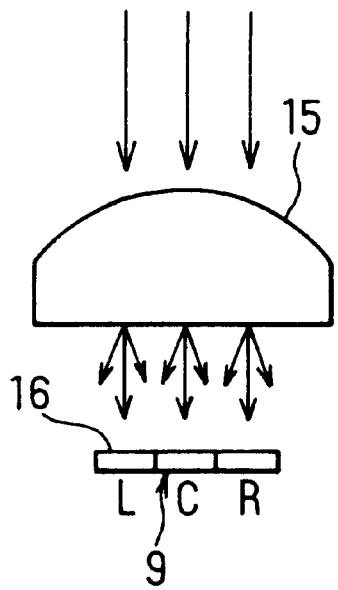
FIG. 14A is a diagram illustrating a situation in which noise light is perpendicularly entered to a condenser lens having a small scatter degree of a second embodiment according to the present invention.
Figure 14B:
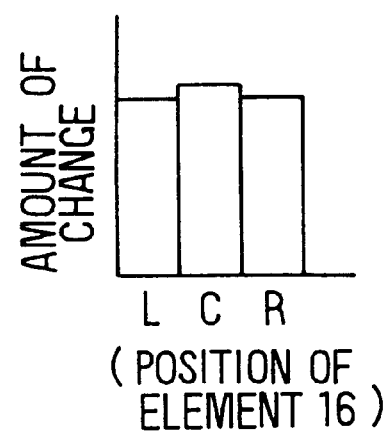
FIG. 14B is a graph illustrating the scatter degree of the noise light in a situation shown in FIG. 14A.
Figure 15A:
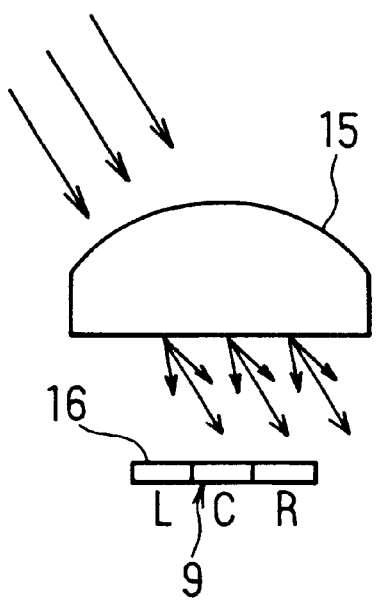
FIG. 15A is a diagram illustrating a situation in which noise light is obliquely entered to a condenser lens having a small scatter degree.
Figure 15B:
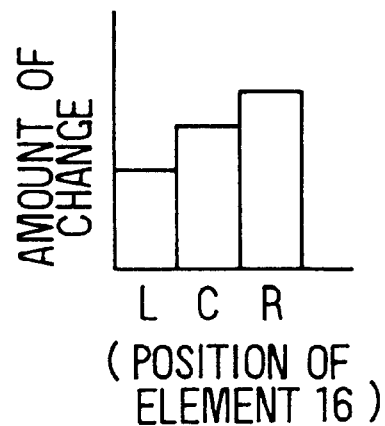
FIG. 15B is a graph illustrating the scatter degree of the noise light in a situation shown in FIG. 15A.

Here, in the case where the degree of the scattering of the condenser lens 15 for the visible light is small, and when the visible light perpendicularly enters the condenser lens 15 as shown in FIG. 14, the detection output (amount of change) from the thermal detection element 16 positioned at a center portion (C) of the infrared rays image sensor 9 becomes large compared to that at a right portion (R) or a left position (L). On the contrary, when the visible light obliquely enters the condenser lens 15 as shown in FIG. 15, the detection output (amount of change) from the thermal detection element 16 positioned at an opposite side (R) from the light-entering side becomes large.

Figure 16A:
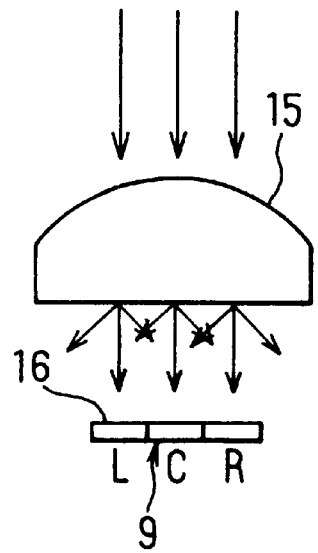
FIG. 16A is a diagram illustrating a situation in which noise light is perpendicularly entered to a condenser. lens having a large scatter degree of a second embodiment according to the present invention.
Figure 16B:
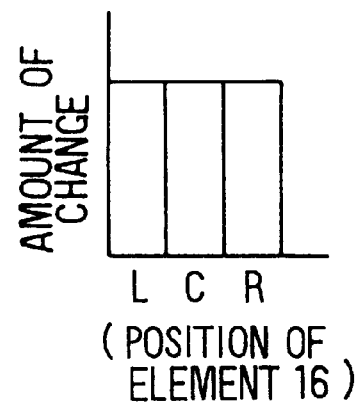
FIG. 16B is a graph illustrating the scatter degree of the noise light in a situation shown in FIG. 16A.
Figure 17A:
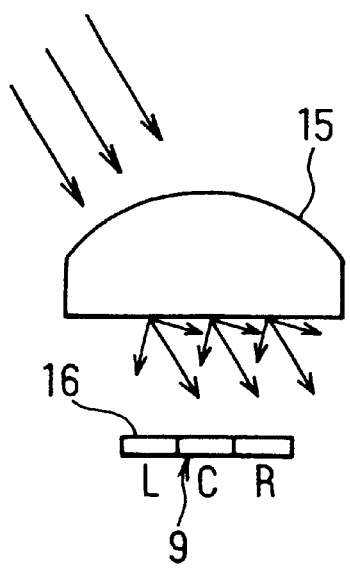
FIG. 17A is a diagram illustrating a situation in which noise light is obliquely entered to a condenser lens having a large scatter degree.
Figure 17B:
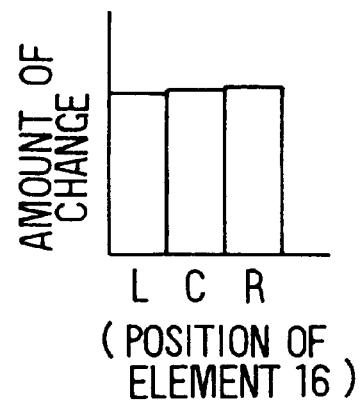
FIG. 17B is a graph illustrating the scatter degree of the noise light in a situation shown in FIG. 17A.

On the contrary, in the case where the degree of the scattering of the condenser lens 15 for the visible light is large, as shown in FIGS. 16 and 17, the detection outputs of the thermal detection elements 16 become uniform, because an entering intensity of the scattered visible light received by the thermal detection elements 16 become substantially uniform independent of the entering direction to the condenser lens 15. Therefore, it is preferable to set the degree of the scattering of the condenser lens 15 for the visible light to large.

Therefore, in this embodiment, the degree of the scattering of the condenser lens 15 is adjusted to large by controlling the surface roughness of the condenser lens.

Figures 18, 19:
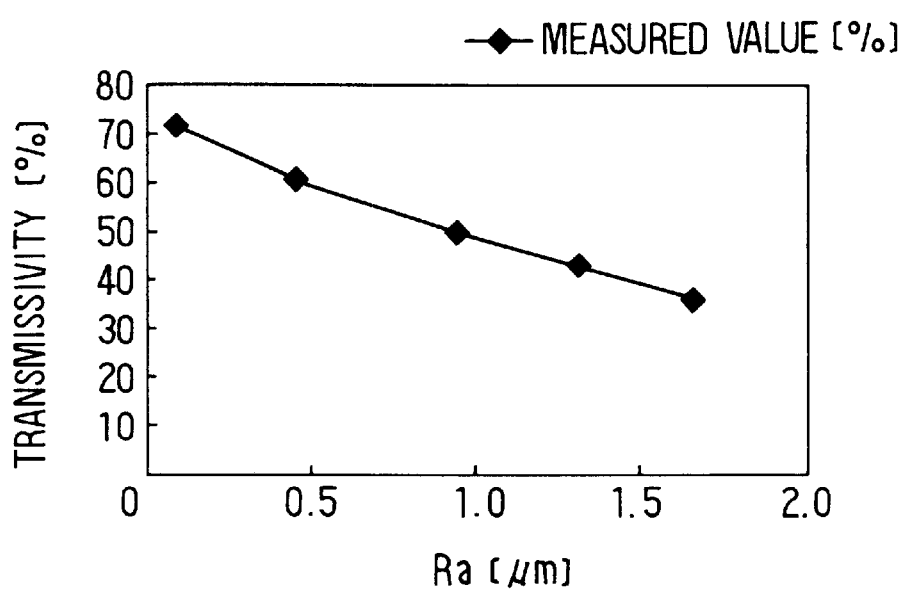
FIG. 18 is a table illustrating a relationship between a surface roughness of the condenser lens and transmissivity of the infrared rays.
FIG. 19 is a graph illustrating a relationship between the surface roughness of the condenser lens and transmissivity of the infrared rays.

FIGS. 18 and 19 respectively show a table and a graph illustrating a relationship between a surface roughness of the condenser lens 15 and transmissivity of the infrared rays. According to FIGS. 18 and 19, when the surface roughness of the condenser lens 15 is equal to or less than 0.5 Ra, a decrease of the transmissivity for the infrared rays wavelength range can be prevented and further the degree of the scattering of the visible light can be enhanced. This is because the scattering, which occurs when the particle diameter is remarkably big compared to the wavelength of the entered light, can be further enhanced, and the scattering of the infrared rays for around 10 $\mu$m becomes ignorable small, as described in (3) in the explanation of the scattering condition of the visible light in the first embodiment.

In detail, the surface of the condenser lens 15 is not finished by so-called mirror polishing having high surface accuracy, but is remained as being cut (a surface accuracy is equal to or less than 0.5 Ra).

Here, when a standard infrared rays transmissivity is around 50% at around 10 $\mu$m range infrared rays, the surface roughness Ra may be equal to or less than 1 ($\mu$m).

According to this second embodiment, a detection accuracy of the target object to be measured can be further improved with preventing the influence of the noise light, by further enhancing the degree of the scattering of the condenser lens 15 for the visible light by controlling the surface roughness of the condenser lens 15.

Furthermore, this effect can be achieved by manufacturing the condenser lens 15 as cut off without increasing a cost.

(Third embodiment)

Figure 20:
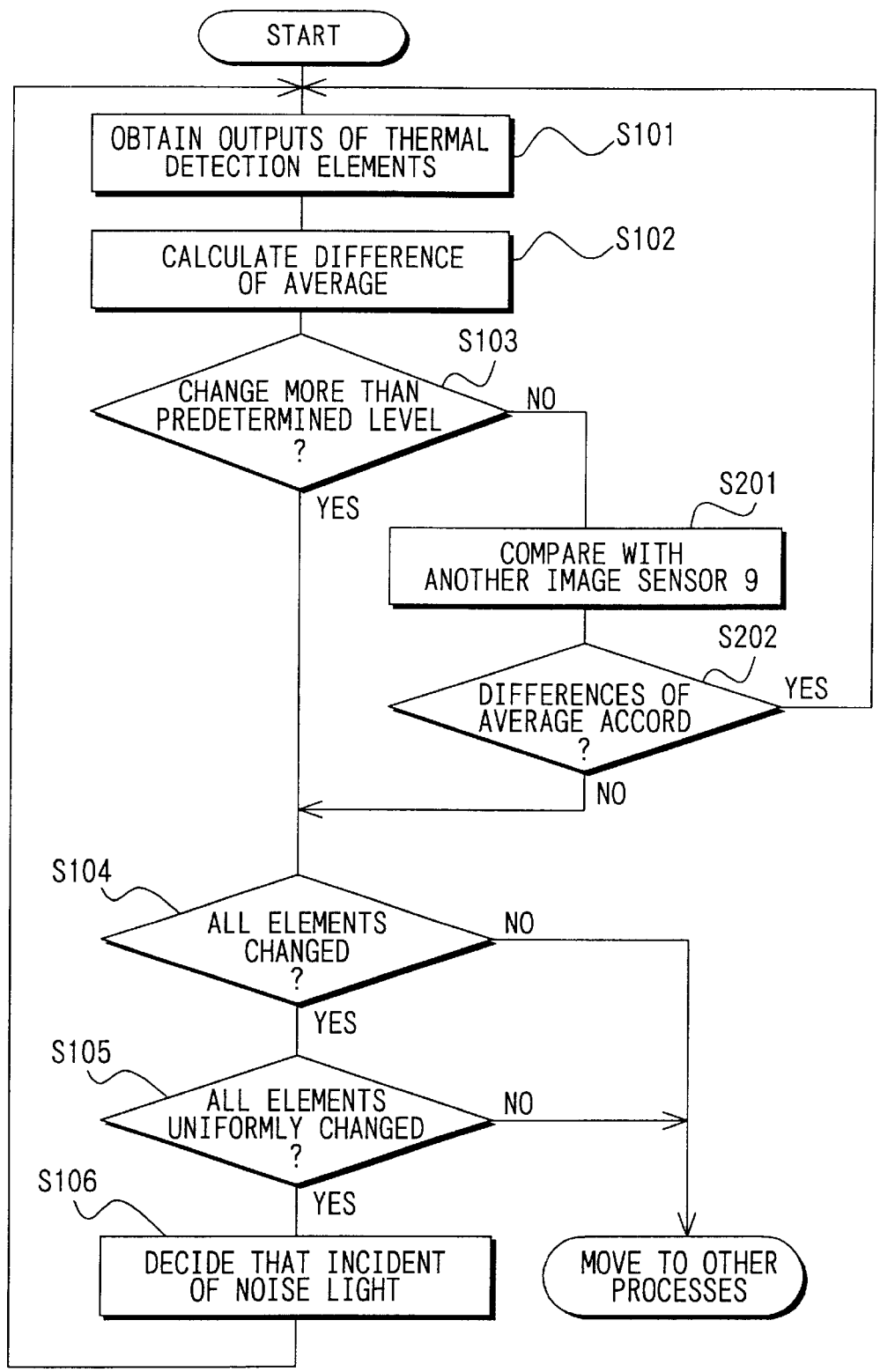
FIG. 20 is a flowchart illustrating a noise light entering judgment performed by the signal detection/process circuit of a third embodiment according to the present invention.

Next, a third embodiment of the present invention will be explained with reference to FIG. 20. In this embodiment, the signal detection/process circuit 19 is formed so as to detect the entering the noise light, even when the detection outputs from the thermal detection elements 16 are gradually changed due to the noise light.

In the first embodiment, the signal detection/process circuit 19 can cope with a situation where the noise light such as the solar light is suddenly entered. However, an amount of entering light due to the solar light may gradually increase by causing an influence of movement of cloud. In this case, the detection outputs from the thermal detection element 16 change slowly.

Therefore, according to the signal detection/process circuit 19 of this embodiment, when the difference between average of the obtained data in this time and that of the obtained data in last time is smaller than the predetermined level (step S103: NO), the signal detection/process circuit 19 compares with output changes of another infrared rays detection apparatus (step S201), which detects a temperature distribution of the other seat, and judges whether the difference between averages accord with each other (step S202). Here, when the signal detection/process circuit 19 judges that the difference between averages do not accord with each other (step S202: NO), it moves to step S104 to judges the entering the noise light. That is, when the temperature of the entire passenger room is uniformly changed, the same output changes should be occurs in another infrared rays image sensor 9 for the other seat. However, it is not natural that noise light simultaneously enters all seats. Therefore, in the case where the output changes of the infrared rays image sensor 1 is small, and when the output changes are different from those of another infrared rays image sensor 9 for the other seat, the signal detection/process circuit 19 moves to step S104 to judges the entering the noise light.

According to the third embodiment, it can further enhance reliability of judgment of the noise light entering, by using detected data of the infrared rays detection apparatus for the other seat.

(Fourth embodiment)

Next, a fourth embodiment of the present invention will be explained with reference to FIGS. 21 and 22. In this embodiment, a reference element 9a is applied to the infrared rays image sensor 9 of one of the above-described embodiments.

Figure 21A:
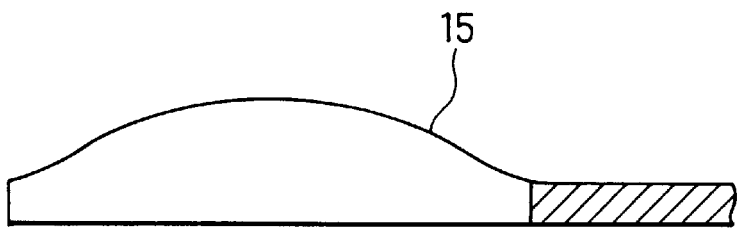
FIGS. 21A and 21B are diagrams illustrating arrangements of the condenser lens and the infrared rays image sensor of fourth embodiment according to the present invention.
Figure 21B:
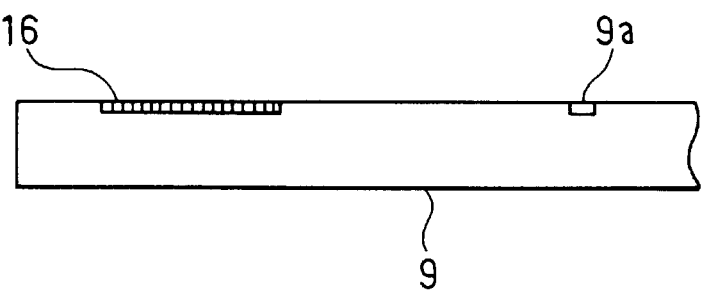

As shown in FIG. 21, a bolimeter type infrared rays image sensor 9 is generally provided with the thermal detection element 16, which absorbs the infrared rays condensed by the condenser lens 15; and a reference element 9a positioned so that the infrared rays from the target object to be measured does not enter therein. Here, the temperature of the target object to be measured is detected by a difference between outputs from the thermal detection elements 16 and outputs from the reference element 9a. According to this structure, the reference element 9a is arranged at a position at which is not influenced by the scattered visible light.

Figure 22A:
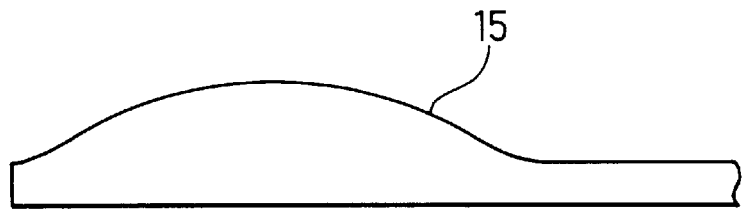
FIGS. 22A and 22B are diagrams illustrating arrangements of the condenser lens and the infrared rays image sensor.
Figure 22B:
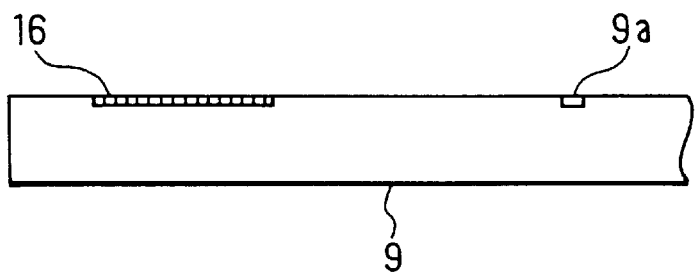

On the contrary, in this embodiment, as shown in FIG. 22, the reference element 9a is positively arranged so that the scattered visible light entered therein, and a difference between the outputs from the thermal detection elements 16 and the output of the reference element 9a. As a result, an amount of the entered visible light can be cancelled each other, so that the detection outputs can be obtained without causing influence of the scattered visible light.

According to the fourth embodiment, since the infrared rays image sensor 9 is constructed so that the scattered visible light is positively entered into the reference element 9a, and the output difference between the thermal detection elements 16 and the reference element 9a is used as the detection output, the thermal image data of the target object to be measured can be accurately made with preventing the influence of the visible light without detecting the entering of the visible light alike the above-described embodiment.

(Fifth embodiment)

Figure 23:
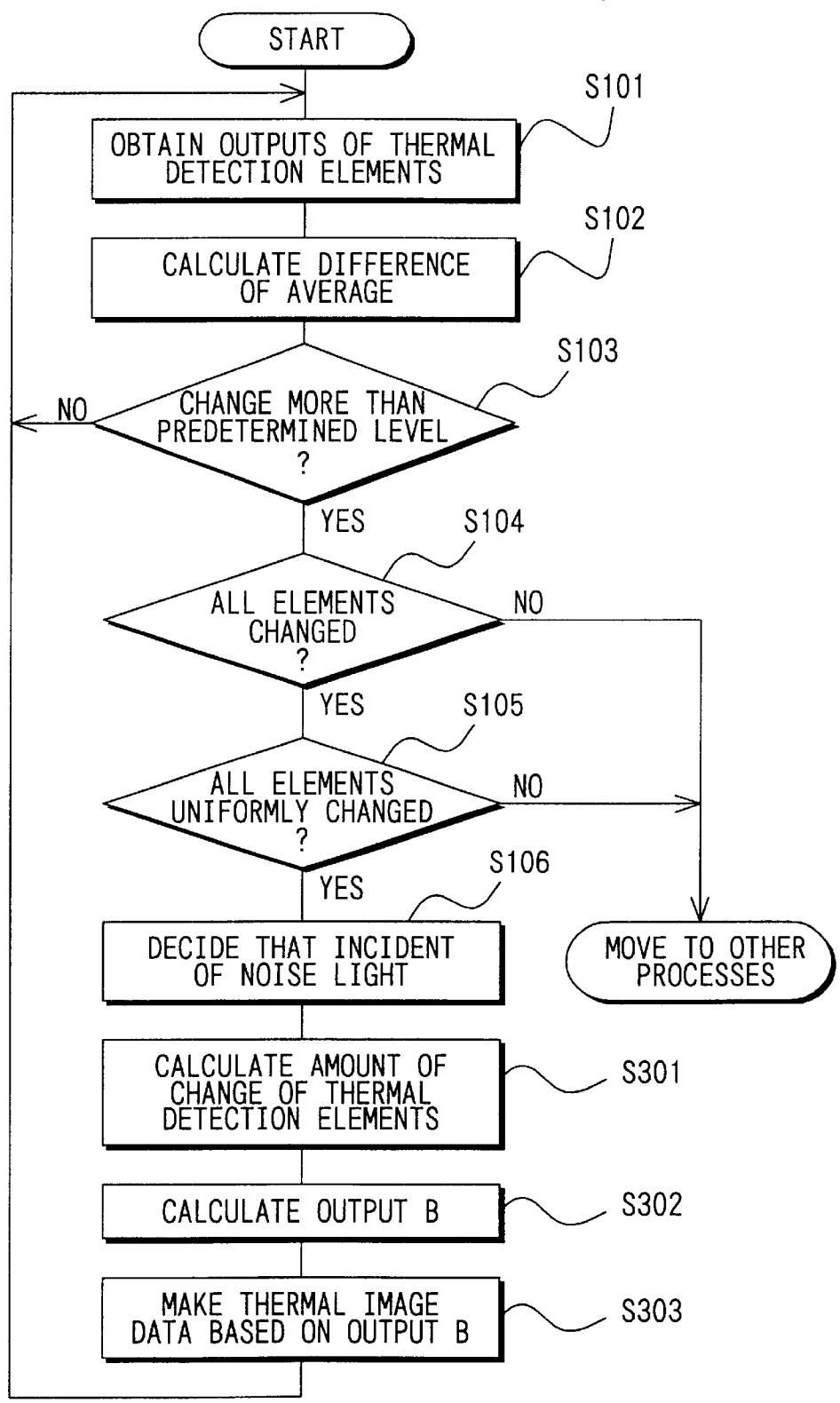
FIG. 23 is a flowchart illustrating a noise light entering judgment performed by the signal detection/process circuit of a fifth embodiment according to the present invention.

Next, a fifth embodiment of the present invention will be explained with reference to FIG. 23. In this embodiment, the structure of the infrared rays detection apparatus 1 is basically the same as that of the first embodiment. In FIG. 23, the same step numbers are putted to the same steps or corresponding steps to that in FIG. 11, so as to omit the redundant explanation. In this embodiment, when the signal detection/process circuit 19 judges that the noise light is entered to the thermal detection element 16, the signal detection/process circuit 19 makes the thermal image data with preventing the influence of the entered noise light.

In detail, when the signal detection/process circuit 19 judges that the noise light is entered to the thermal detection element 16, at step S106, the signal detection/process circuit 19 calculates an amount of changes A of the detection output of each of the thermal detection elements 16 (step S301). After that, the signal detection/process circuit 19 calculates an original detection output B by subtracting the amount of the changes A from the detection output from each of the thermal detection elements 16 (step S302), and makes thermal image data by using the original detection output B (step S303). The thermal image data made in this way is sent to the various types of system control circuits 23 through the data sensing circuit 22, and is used for detecting the position of person existing in the target detection area.

According to the fifth embodiment, when the signal detection/process circuit 19 judges that the noise light is entered to the thermal detection element 16, the signal detection/process circuit 19 calculates makes the thermal image data by calculating the original detection output by subtracting the amount of the noise light from the detection output from each of the thermal detection elements 16. Therefore, the thermal image data can be made even when the noise light is entered. As a result, since each of the various types of system control circuits 23 can operate by obtaining the thermal image data regardless of the entering of the noise light, it can prevent the system from stopping due to the entering of the noise light to the thermal detection element 16 compared to the first embodiment.

Furthermore, this embodiment can be applied to the second or the third embodiment. Here, in order to calculate the amount of the noise light, an average of the amount of the changes of the all thermal detection elements 16, in stead of calculating the amount of the noise light of each of the thermal detection element 16 at step S301.

The present invention can be modified as follows. The infrared rays image sensor 9 can be used as a solar light sensor. That is, when the visible light is detected to enter, it can be assumed that the solar light is entered to the passenger room. Therefore, person in the passenger room can feel more comfort independent of the solar radiation to the passenger room, by enhancing air-condition regarding a particular person who is radiated by the solar light. Furthermore, the normal condenser lens may be used, and an optical window member having a characteristic, which scatters the noise light, may be provided on a front side.

What is claimed is:

1. An infrared rays detection apparatus:
   an optical window for filtering noise light, for transmitting infrared rays within a specific wavelength band, and for condensing the infrared rays transmitted therethrough;
   a plurality of thermal detection elements for image-forming the condensed infrared rays and for outputting detection outputs;
   a thermal data generator for generating a thermal image of a target object to be measured based on the detection outputs; and
   a judging portion for, when the detection outputs uniformly change each other, determining that the noise light is entered to the thermal detection elements.

2. An infrared rays detection apparatus according to claim 1, wherein the thermal data generator calculates an amount of the noise light entered to the thermal detection elements, when the judging portion determines that the noise light is entered to the thermal detection elements, and generates the thermal image data by calculating an original detection outputs by subtracting the amount of the noise light from the detection outputs of the thermal detection elements.

3. An infrared rays detection apparatus according to claim 1, wherein the plurality of thermal detection elements are two-dimensionally arranged.

4. An infrared rays detection apparatus according to claim 1, wherein the optical window includes:
   an optical window member for filtering noise light including visible light and for transmitting infrared rays within a specific wavelength band; and
   a condenser lens for condensing the infrared rays transmitted through the optical window member.

5. An infrared rays detection apparatus according to claim 4, wherein the optical window member contains therein a plurality of particulates to scatter the noise light.

6. An infrared rays detection apparatus according to claim 4, wherein the optical window member has a surface whose surface roughness is equal to or less than 0.5 Ra to scatter the noise light.

7. An infrared rays detection apparatus according to claim 1, wherein the judging portion determines that the noise light is entered to the thermal detection elements, by comparing the detection outputs with the other detection outputs detected by another infrared rays detection apparatus.

8. An infrared rays detection apparatus according to claim 1, wherein the judging portion includes:
   a calculation portion for calculating a difference between an average of the detection outputs received in this time and an average of the detection outputs received in last time; and a determining portion for determining that noise light is entered, when the differences with respect to all thermal detection elements are equal each other and are equal to or more than a predetermined value.

9. An infrared rays detection apparatus:

an optical window for filtering noise light, for transmitting infrared rays within a specific wavelength band, and for condensing the infrared rays transmitted therethrough;

a thermal detection element for image-forming the condensed infrared rays and for outputting first detection output;

a thermal data generator for generating a thermal image of a target object to be measured based on the first detection output;

a reference element for receiving the noise light and for outputting second detection output; and an output portion for calculating a difference between the first detection output and the second detection output, and outputting the difference as an output indicating the infrared rays.

10. An infrared rays detection apparatus according to claim 9, wherein thermal detection element is made up of two-dimensionally arranged plural detection elements.

11. An infrared rays detection apparatus according to claim 9, wherein the optical window includes:

an optical window member for filtering noise light including visible light and for transmitting infrared rays within a specific wavelength band; and a condenser lens for condensing the infrared rays transmitted through the optical window member.

12. An infrared rays detection apparatus according to claim 11, wherein the optical window member contains therein a plurality of particulates to scatter the noise light.

13. An infrared rays detection apparatus according to claim 11, wherein the optical window member has a surface whose surface roughness is equal to or less than 0.5 Ra to scatter the noise light.

14. An infrared rays detection apparatus according to claim 9, wherein the judging portion determines that the noise light is entered to the thermal detection elements, by comparing the detection outputs with the other detection outputs detected by another infrared rays detection apparatus.

15. An infrared rays detection method, comprising:

receiving detection outputs, which indicating thermal image of infrared rays, from a plurality of thermal detection elements;

calculating a difference between an average of the detection outputs received in this time and an average of the detection outputs received in last time; and determining that noise light is entered, when the differences with respect to all thermal detection elements are equal each other and are equal to or more than a predetermined value.

16. An infrared rays detection method according to claim 15, wherein the determining step includes:

judging whether one of the difference with respect to one thermal detection element is equal to or more than a predetermined value; and judging whether all of the differences with respect to all thermal detection elements are equal to or more than the predetermined value; and judging whether the differences with respect to all thermal detection elements are equal each other.

\* \* \* \* \*